US005502886A

United States Patent [19]
Jensen et al.

[11] Patent Number: 5,502,886
[45] Date of Patent: Apr. 2, 1996

[54] COMPOSITE STRINGER DISASSEMBLY MACHINE

[75] Inventors: Donald A. Jensen, Kent, Wash.; Maxine E. Duncan, Salmon, Id.; Joel M. Thomas, Kent, Wash.

[73] Assignee: The Boeing Company, Seattle, Wash.

[21] Appl. No.: 300,107

[22] Filed: Sep. 2, 1994

[51] Int. Cl.$^6$ .................................................. B23P 19/00
[52] U.S. Cl. ........................... 29/701; 29/239; 29/256; 29/281.1; 29/281.5; 29/283; 29/791
[58] Field of Search ............................ 29/238, 239, 244, 29/252, 256, 281.1, 281.3, 281.5, 283, 426.3, 426.5, 525, 701, 703, 790, 791, 795, 897.35

[56] References Cited

U.S. PATENT DOCUMENTS

| | | | |
|---|---|---|---|
| 1,390,153 | 9/1921 | Naylor et al. | 29/238 X |
| 1,620,172 | 3/1927 | Taurman | 29/252 X |
| 2,342,025 | 2/1944 | Watter | 29/281.1 X |
| 3,454,983 | 7/1969 | Anderson et al. | 18/2 |
| 3,579,784 | 5/1971 | Klempner | 29/426.3 X |
| 4,980,013 | 12/1990 | Lowery | 156/443 |
| 5,193,789 | 3/1993 | Tucker | 29/252 X |

Primary Examiner—Joseph M. Gorski
Attorney, Agent, or Firm—Christensen, O'Connor, Johnson & Kindness PLLC

[57] ABSTRACT

A machine (28) for use in removing first and second mandrels (20) from a stringer assembly (26) that includes a composite I-beam and the mandrels is disclosed. The mandrels are located in channels on opposite sides of the composite I-beam. The machine includes a framework (30) having an elongate platform (36) for supporting the stringer assembly (26). Mounted on the framework are a plurality of stations (32) located long the longitudinal platform (36). Each station includes first and second movable platforms (42) mounted to opposite sides of the longitudinal platform from one another. Each platform includes a clamp (38 and 40) for sequentially clamping the stringer assembly to the framework when the mandrels are being removed. The movable platforms are attached to the mandrels. A jackscrew mechanism moves the movable platforms with respect to one another when the sides of the stringer assembly are clamped to the platform. The force created by the jackscrews pulls the mandrels away from the composite I-beam, first from one side of the stringer assembly then from the other side. A third clamp (76), mounted to one side of the framework, is used to clamp the one side of the composite I-beam to the framework after the mandrel has been removed from that side of the beam.

6 Claims, 11 Drawing Sheets

Fig. 11.

| INSTRUCTIONS |
|---|

① VERIFY JACK SCREWS ARE IN "FULL OPEN JACK SCREWS" POSITION
LOAD LM'S ON TABLE
REMOVE 30HME180W2111 & OHME172W1100

② "FULL CLOSE JACK SCREWS" TO CENTER LM'S ON TABLE

MANUALLY: REMOVE TAPE & INSTALL PINS (BOTH SIDES)

③ "CLOSE SIDE A CLAMP" TO CLAMP SIDE A LM

④ "3/4 INCH OPEN JACK SCREWS" TO BREAK SIDE B LM FREE

⑤ "FULL CLOSE JACK SCREWS" TO PUSH SIDE B BACK INTO STRINGER

⑥ "OPEN SIDE A CLAMP" TO RELEASE SIDE A LM

⑦ "CLOSE SIDE B CLAMP" TO CLAMP SIDE B LM

⑧ "3/4 INCH OPEN JACK SCREWS" TO BREAK SIDE A LM FREE

⑨ "7 INCHES OPEN JACK SCREWS" & INTERLOCK OVERRIDE
TO PULL SIDE A LM ALL WAY OUT TO TROUGH BACKSTOP

⑩ "CLOSE STRINGER CLAMP" TO CLAMP SIDE A STRINGER

⑪ "OPEN SIDE B CLAMP" TO RELEASE SIDE B LM

⑫ "CLOSE SIDE A CLAMP" TO CLAMP SIDE A LM

⑬ "FULL OPEN JACK SCREWS"
TO PULL SIDE B ALL WAY OUT TO TROUGH BACK STOP

⑭ "OPEN STRINGER CLAMP" TO RELEASE SIDE A STRINGER CLAMP

⑮ "OPEN SIDE A CLAMP" TO RELEASE SIDE A LM

MANUALLY: REMOVE PINS (BOTH SIDES), CAUL PLATES & STRINGER

⑯ "CLOSE SIDE A CLAMP" TO CLAMP SIDE A LM

⑰ "10.4 INCHES OPEN JACK SCREWS" TO PUSH SIDE B TO ROTATION POSITION

⑱ "OPEN SIDE A CLAMP" TO RELEASE SIDE A LM

⑲ "5.2 INCHES OPEN JACK SCREWS" TO PUSH SIDE A TO ROTATION POSITION

⑳ "FULL OPEN JACK SCREWS"
REMOVE LM'S WITH OHME180W2111 & OHME172W1100

COMPOSITE STRINGER DISASSEMBLY MACHINE

FIELD OF THE INVENTION

The present invention relates to a method and apparatus for removing a part from tools used to form the part, and more particularly to a method and apparatus for removing mandrels from a composite stringer used to form the stringer.

BACKGROUND OF THE INVENTION

The use of composite materials in the manufacture of aircraft and other lightweight structures has increased steadily since the introduction of such materials. Composite materials have a high strength-to-weight ratio and stiffness, making them attractive in the design of lightweight structures. One drawback to using composite materials in the past has been high fabrication costs. It has been difficult to produce composite parts for the same cost as comparable metal parts. The cost differential is especially notable in large-scale parts or parts having abrupt or complex contours.

One of the largest contributors to composite structure costs is the amount of manual labor required during fabrication. Composite parts having abrupt or complex contours must be formed by manually laying up individual layers of composite material on a lay-up mandrel. Larger parts having more gradual contours, for example, large wing skins, may be fabricated using automated tape laying machines.

Automated tape laying machines have a robotic arm that places individual layers of composite prepreg on a mandrel to form a composite part. Automated tape laying machines can place individual layers of prepreg at a high rate, thus possibly reducing fabrication time and cost. The mechanics of automated tape laying machines limits their ability to place layers of composite prepreg over some geometries. Automated tape laying machines generally cannot place composite prepreg around abrupt curvatures or tight radiuses of curvature.

A common composite support structure used in the construction of aircraft and other light-weight structures is the "I"-beam or "I"-stringer. Due to the abrupt curvatures, I-beams and other beam-type composite structures are generally formed by manually placing layers of composite material over a lay-up mandrel. An automated cutting machine is used to cut each layer of composite prepreg to the proper shape. The individual layers of prepreg are then placed on two separate lay-up mandrels by hand. Once properly positioned, each layer of prepreg is manually formed to the exterior contours of the lay-up mandrel to form two "C-channels."

The C-channels and lay-up mandrels are then rotated so that the C-channels can be joined together along their vertical webs to form an I-beam. After joining, a triangular composite radius filler is placed in the triangular recesses formed in the center of the top and bottom flanges during joining. Top and bottom composite reinforcement layers are then manually placed on the top and bottom of the I-beam. The resulting I-beam is then bagged and autoclave cured. Thereafter, the mandrels are removed.

The entire I-beam fabrication process is labor intensive and time consuming. In addition to the labor required to place the composite material, labor is also required to manipulate the lay-up mandrels. Generally, lay-up mandrels are quite large and heavy, making them difficult to maneuver. After the two C-channels are formed, a crane or similar handling device is used to engage the individual lay-up mandrels and transport them to an assembly table. The mandrels are then manually maneuvered, rotated, and aligned using levers, etc. The two channels are then bonded together using a vacuum membrane in a laborious, time-consuming process. Once bonded, a triangular radius filler is added to the top. The lay-up mandrels are then rotated 180° so that a triangular radius filler may be applied to the bottom of the I-beam. Finally, the resulting I-beam and lay-up mandrels must be placed on a curing mandrel for vacuum bagging and subsequent curing.

In addition to being costly, the extensive use of manual labor during the fabrication process produces quality control problems. Individual layers of composite prepreg are often incorrectly positioned. Extensive manual handling during fabrication also increases the likelihood of foreign materials being introduced into the completed part. Incorrectly placed layers of composite and foreign material are large contributors to overall part rejection rates. Further, it is difficult to manually remove elongate mandrels from formed I-beams without injuring the beams.

Thus, a need exists for methods and apparatus that reduce the amount of manual labor required during the fabrication of structures, particularly large structures, from composite materials. The present invention is directed to meeting this need. In particular, the present invention is directed to apparatus for removing mandrels from composite I-beams after the beams are formed.

SUMMARY OF THE INVENTION

In accordance with the present invention, a composite stringer disassembly machine is provided. The machine is designed to remove a pair of mandrels from the opposite sides of a stringer assembly comprising a composite I-beam, and mandrels rigidly held in the channels of the I-beam. The mandrels are rigidly held in the channels of the I-beam because during previous autoclave curing of the stringer assembly, the mandrels become semi-bonded in place due to resin flow.

The machine includes a framework for supporting the stringer assembly and a plurality of stations located along the framework. Each station includes first and second movable platforms positioned on opposite sides of the stringer assembly. Each platform includes first and second clamps for clamping the stringer assembly to the framework, when the mandrels are in the channels of the composite I-beam, and a connecting mechanism for releasably connecting each platform to the mandrels. Another set of clamps are mounted to one side of the framework for clamping one side of the composite I-beam to the framework after a mandrel has been removed from that side of the stringer assembly.

In accordance with other aspects of this invention, each station includes a linear actuator that interconnects the first and second platforms. The linear actuator is mounted such that the operation of the linear actuator causes the first and second platforms to move relative to one another.

In accordance with further aspects of this invention, the clamps of the composite stringer disassembly machine are pneumatically powered and the linear actuators are electrically powered. Further, the composite stringer assembly machine includes a logic controller for controlling the application of pneumatic and electric energy to the clamps and to the linear actuators. The logic controller provides interlocks to ensure that at least some functions of the machine are not performed out of a predetermined sequence to prevent damage.

In accordance with still further aspects of this invention, a method for removing a pair of mandrels rigidly held in the channels of a composite I-beam is also provided. The method includes the steps of supporting the I-beam/mandrel assembly on a platform; clamping one side of the assembly of the platform; pulling the mandrel away from the opposite side of the assembly; reinserting the removed mandrel; clamping the side of the assembly with the reinserted mandrel to the platform; unclamping the clamped side of the assembly from the platform; and pulling the other mandrel away from the assembly.

The present invention may be used with fabrication equipment disclosed in copending patent applications to improve composite fabrication methods. In one of the other copending patent applications, an articulating arm used to transport and rotate the lay-up mandrels is disclosed. In another application apparatus for draping composite charges around mandrels to create a pair of C-shaped composite charges is disclosed. In yet another patent application, a method and apparatus for joining two C-shaped composite charges mounted on mandrels to form a stringer assembly of the type disassembled by the present invention is disclosed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 11 is a table listing the sequence in which buttons shown in FIG. 10 are pressed.

DETAILED DESCRIPTION OF THE PREFERRED EMBODIMENT

Introduction

The typical procedure for forming a composite I-beam stringer is to drape composite charges 22 around elongate rectangular mandrels 20 to create C-shaped charges, join the charges back-to-back, add fillers and caps 24 (and other elements as necessary), and cure the resulting assembly. The end result is a stringer assembly 26 of the type illustrated in FIG. 1. A difficulty associated with a stringer assembly of the type shown in FIG. 1, regardless of how created, is the removal of the mandrels 20. In the past, this was accomplished by manual methods. Knives, chisels, and wedges were driven into the ends of stringer assembly 26 between the channels of the composite I-beam and the mandrels 20. The wedges were driven further into assembly 26 using wooden pusher sticks until the mandrels 20 where broken free from the assembly.

There are several problems with the foregoing removal procedure. First, the channel charges 22, and/or the mandrels 20 are often damaged by the tools used to remove the mandrels. Second, the procedure is laborious and time-consuming. Because the mandrels can weigh as much as 600 pounds, they are difficult to maneuver. Steel levers are often used to maneuver the mandrels 20. Because the mandrels 20 strongly adhere to the channel charges 22, separation is time-consuming. Finally, the procedure can be hazardous to personnel. Personnel can injure themselves with the tools previously used to separate the mandrels 20 from a stringer assembly 26. Injury can also result from maneuvering the heavy mandrels 20. The present invention is directed to avoiding these and other problems and provides a method and a machine for carrying out the method.

Mechanical Description of the System

Figure 1:
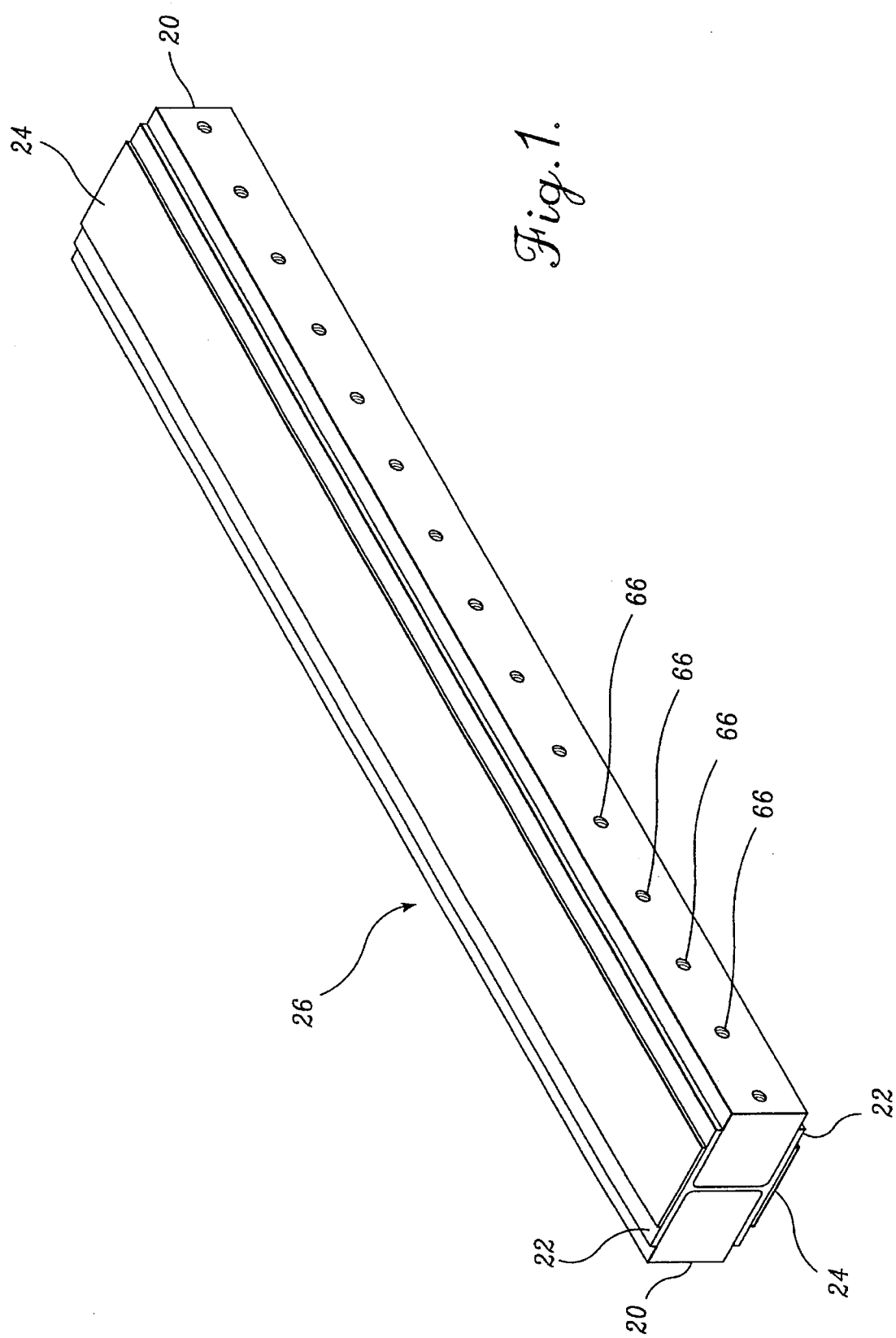
FIG. 1 is a perspective view of a stringer assembly comprising a composite I-beam and a pair of mandrels rigidly held in the channels of the I-beam.
Figure 2:
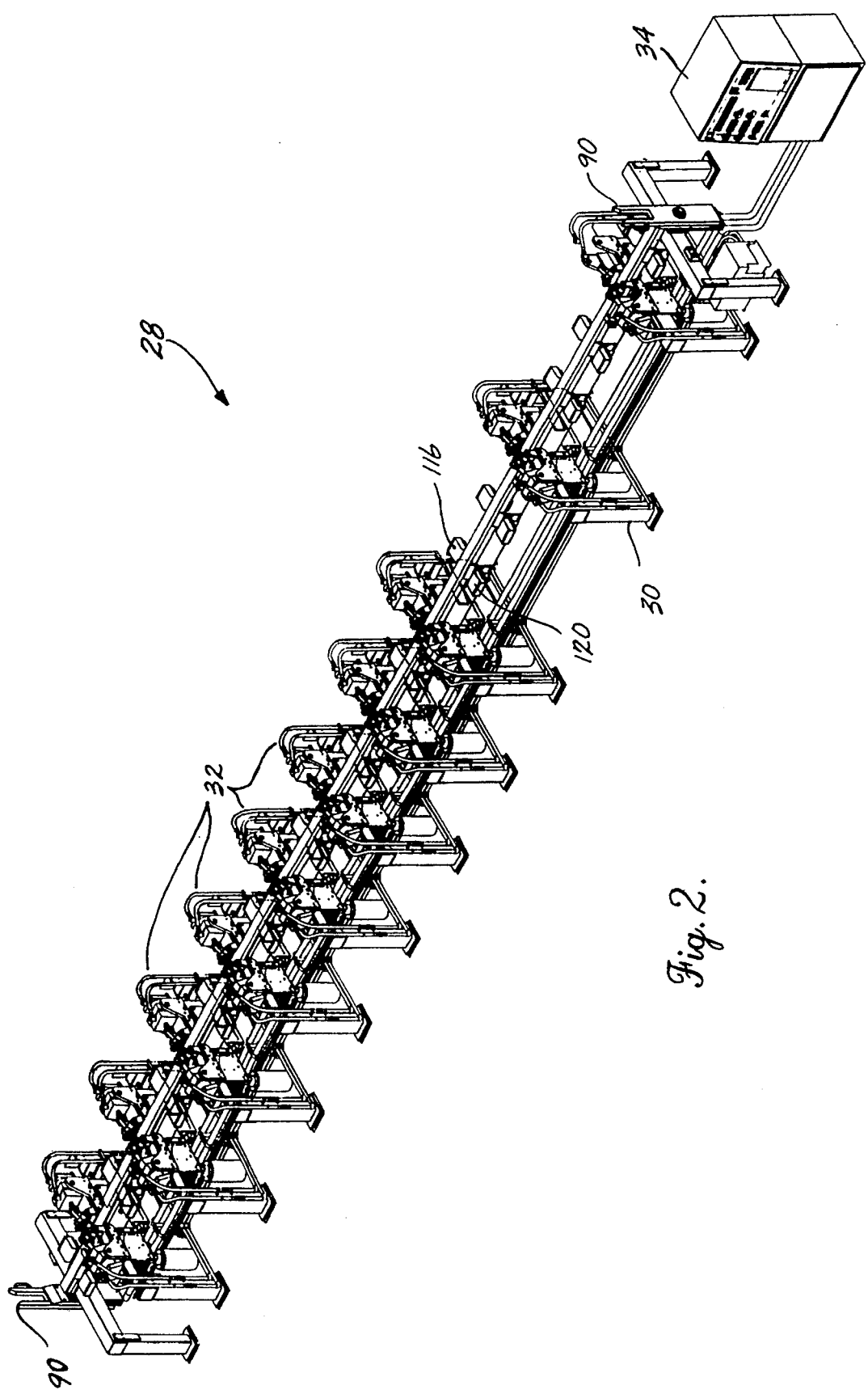
FIG. 2 is an overall perspective view of a composite stringer disassembly machine formed in accordance with the present invention.

FIG. 2 depicts a composite stringer disassembly machine, indicated generally by reference numeral 28, formed in accordance with the present invention, for removing mandrels 20 from a stringer assembly 26 of the type shown in FIG. 1. The composite stringer disassembly machine 28 shown in FIG. 2 includes a framework 30 for supporting a stringer assembly 26, a plurality of stations 32 located along the length of framework 30 and a control console 34 for controlling the operation of the machine.

Figure 3:
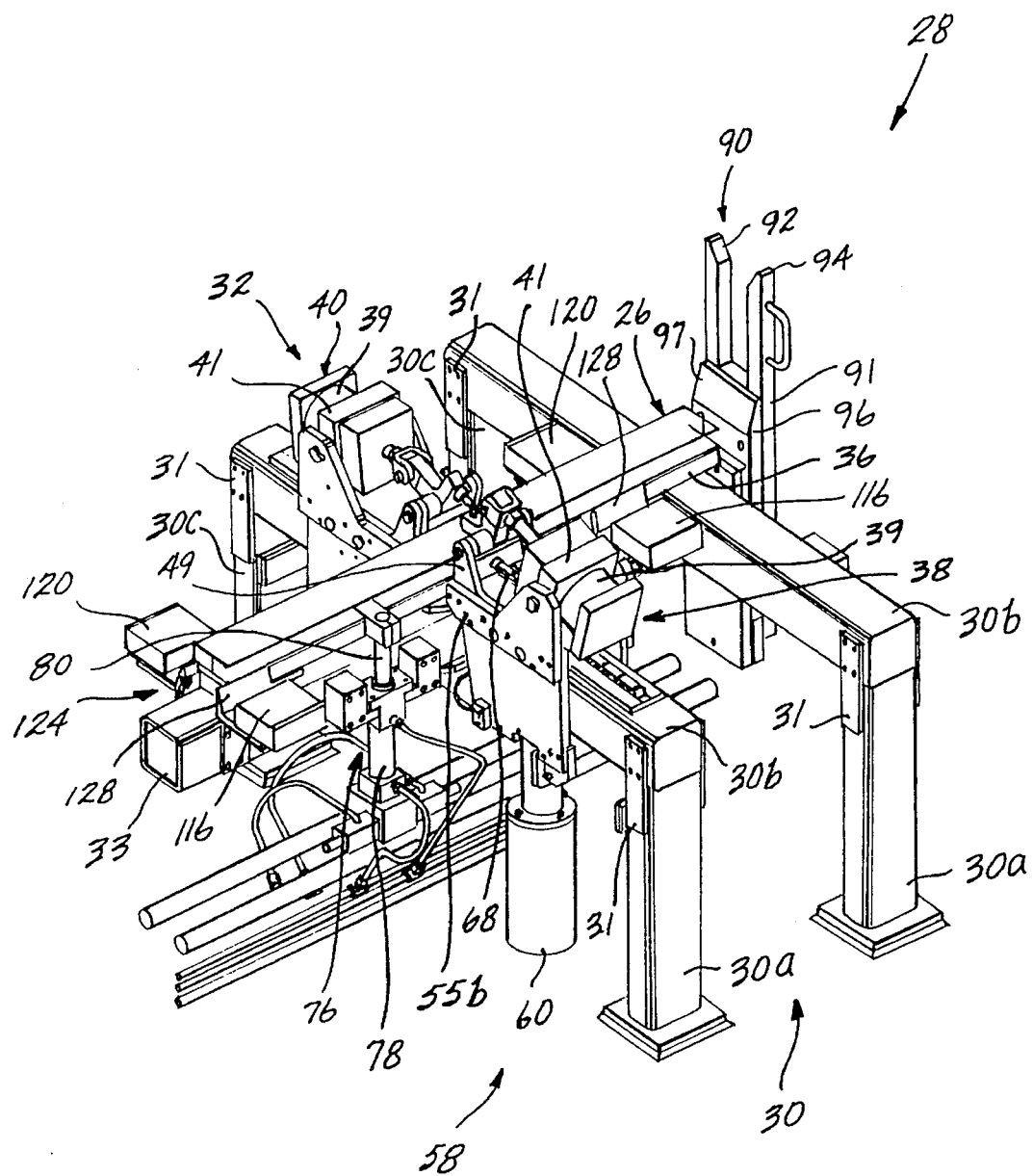
FIG. 3 is an enlarged perspective view of a station of the machine of FIG. 2.

An enlarged view of a portion of composite stringer disassembly machine 28 of FIG. 2 is shown in FIG. 3. The view is from the end of the machine 28 opposite control station 34, and includes a view of one station 32. As shown in FIG. 3, the framework 30 is formed by a plurality of inverted U-shaped members rigidly attached to the floor in spaced apart relationship. Preferably, the U-shaped members are formed of rectangular tubes 30a, 30b, and 30c attached by plates 31. Two of the rectangular tubes 30a and 30c form legs and the other rectangular tube forms a cross-member 30b. Spanning the U-shaped members and rigidly affixed to the centers of the cross legs of the U-shaped members is a longitudinal rectangular tube 33. Mounted atop the longitudinal rectangular tube 33 is a longitudinal platform 36. The longitudinal platform 36 supports a stringer assembly 26 during disassembly, i.e., removal of the mandrels 20 from the assembly.

Affixed to the longitudinal rectangular tube, between the stations 32 are a plurality of pairs of side platforms 116 and 120. The side platforms are supported by L-shaped brackets 117 and 121, affixed to the side of the rectangular tube 33, as shown best in FIG. 4. Since the side platforms are located on opposite sides of the rectangular tube 33, they are located on opposite sides of the longitudinal platform 36. The side platforms 116 and 120 are relatively short compared to the length of the longitudinal platform 36. The side platforms are spaced from the longitudinal platform, resulting in a trough 128 being formed therebetween. Further, the tops of the side platforms 116 and 120 are substantially planar with the top of the longitudinal platform 36.

Figure 4:
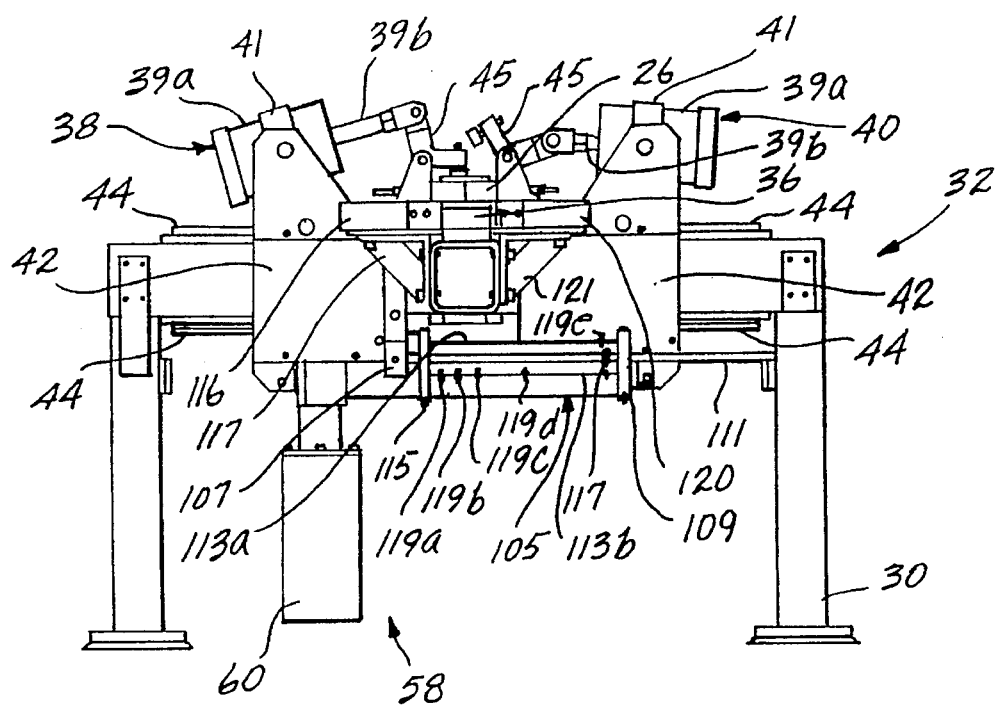
FIG. 4 is an end elevational view of the station of FIG. 3.
Figure 5:
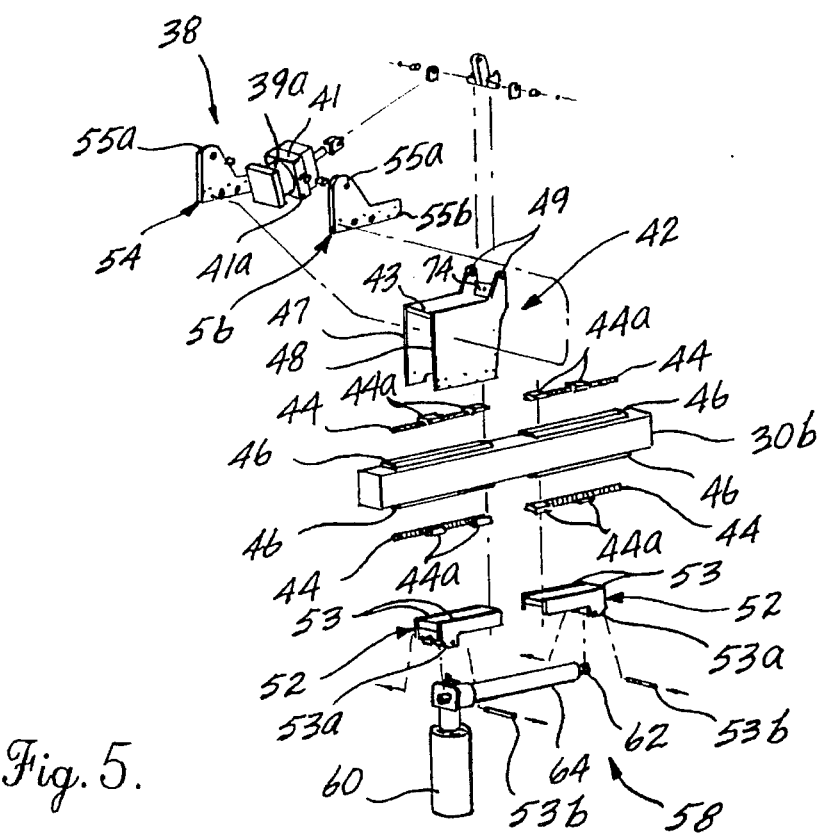
FIGS. 5 and 6 are partially exploded perspective views of portions of the station of FIG. 3.

An end elevational view of a station 32 is shown in FIG. 4, looking away from the control station 34. As shown in FIGS. 3 and 4, each station 32 includes a pair of hold-down clamps 38 and 40, disposed on the cross legs of the U-shaped members on opposite sides of the longitudinal axis of stationary platform 36. The hold-down clamps 38 and 40 are for clamping a stringer assembly 26 to the longitudinal platform 36. FIG. 4 illustrates one of the hold-down clamps 38 in an extended, or engaged (clamped) position. In the extended position, the hold-down clamp presses the stringer assembly 26 against the stationary platform 36. In contrast, the other hold-down clamp 40 is shown in FIG. 4 in the retracted or disengaged position. Since the hold-down clamps 38 and 40 are substantially identical to one another, only one is described in detail. The hold-down clamps include a pneumatic actuator that includes a cylinder 39a. An exploded view of one of the hold-down clamps is shown in FIG. 5. A bracket 41 circumferentially surrounds the midpoint of the pneumatic cylinder 39a. Pivot pins 41a and 41b (only one pivot pin 41a is visible in FIG. 5) radially extend from opposite sides of the bracket 41, in a direction generally parallel to the longitudinal axis of the stationary platform 36. (The foregoing arrangement is often referred to as a trunnion mount) The pivot pins 41a and 41b extend into identical plates 54 and 56.

The plates 54 and 56 are mounted in a spaced apart, generally parallel relationship with one another, and such that the plane of the plates lies generally orthogonal to the longitudinal axis of the longitudinal platform 36. Each plate 54 and 56 includes an inverted, generally U-shaped portion 55a formed at the end of each plate opposite the stationary platform 36. The inverted U-shaped portion 55a extends upwardly from a more-or-less horizontally extending base portion 55b. The pivot pins 41a and 41b extend axially through each inverted U-shaped portion 55. Thus, the pneumatic cylinder 39a is pivotally suspended between the plates 54 and 56.

As shown in FIG. 4, the lower edges of each plate 54 and 56 are affixed to a mobile platform 42. An exploded view of the mobile platform 42 and how the hold-down clamps are supported by the mobile platform is also illustrated in FIG. 5. Each mobile platform 42 includes a pair of generally parallel side plates 47 and 48 that combine to define a downwardly directed channel through which one of the horizontal rectangular tubes 30b that form the cross-legs of the framework 30 passes. The side plates 47 and 48 comprising the mobile platform 42 are generally trapezoidal shaped, and lie orthogonal to the longitudinal axis of the longitudinal platform 36. Outer and inner bridge members 43 and 74 connect the upper corners of the side plates 47 and 48 together above the rectangular tube 30b. The inner bridge member 74 is a plate that connects the upper corners nearest stationary platform 36 together, while the outer bridge member 43 is a plate that connects the other two upper corners together. The plates 54 and 56 of the related hold-down clamp are attached to the outsides of the side plates 47 and 48 of the mobile platform 42.

Each mobile platform 42 is movably attached to the rectangular tube 30b that forms a cross-member of the framework 30 by upper and lower conventional linear carriage and rail;, bearings. The cartage and rail bearings include machined rail mounting pads 46 mounted on the upper and lower sides of rectangular tube 30b that forms the cross-member of the framework 30. A rail 44 is bolted to each mounting pad 46. A pair of linear bearing blocks 44a are slidably mounted on each rail 44. Opposed edges of the linear bearing blocks 44a, located above the cross-member, are attached to the side plates 47 and 48. Each linear bearing block 44a has four internal circuits of ball bearings which continually recirculate during use of the linear bearing blocks.

The lower portion of mobile platform 42 supports a jackscrew bracket 52 (described below) that supports a jackscrew mechanism (also described below). The jackscrew bracket prevents the mobile platform 42 from being lifted off of the rectangular tube 30b that forms a cross-member of the framework 30. A jackscrew bracket 52 is affixed to and mounted between the lower ends of the side plates 47 and 48. The lower linear bearing blocks 44a mourned on the rails located beneath the rectangular tubes 30b that form the cross-members of the framework 30 are attached to the jackscrew bracket 52.

Linear cartage and rail bearing systems, sold under the trademark THOMSON ACCUGLIDE, have been found suitable for use in one actual embodiment of the present invention. THOMSON ACCUGLIDE linear carriage and rail bearing systems are manufactured by Thomson Industries, Inc. of Port Washington, N. Y.

Returning to FIG. 5 and the hold-down clamps, the upper corner 49 of each side plate 47 and 48 of the mobile platforms 42, extend upwardly so as to lie above the upper edges of the base portions 55b of the previously described plates 54 of the hold-down clamps. The cylinder shafts 39b of the pneumatic actuators of the hold-down clamps extend outwardly from the pneumatic cylinders 39a of the actuators, toward the longitudinal platform 36, as shown in FIG. 4. The end of each cylinder shaft 39b is pivotally connected to the end of one of the legs of a generally L-shaped member 45. The vertex of each L-shaped member 45 is pivotally captured between the upwardly extending corners 49 of the side plates 47 and 48. The L-shaped members 45 are oriented such that the leg pivotally connected to the cylinder shaft 39b extends upwardly and the other leg extends toward and above the longitudinal platform 36.

Figure 8:
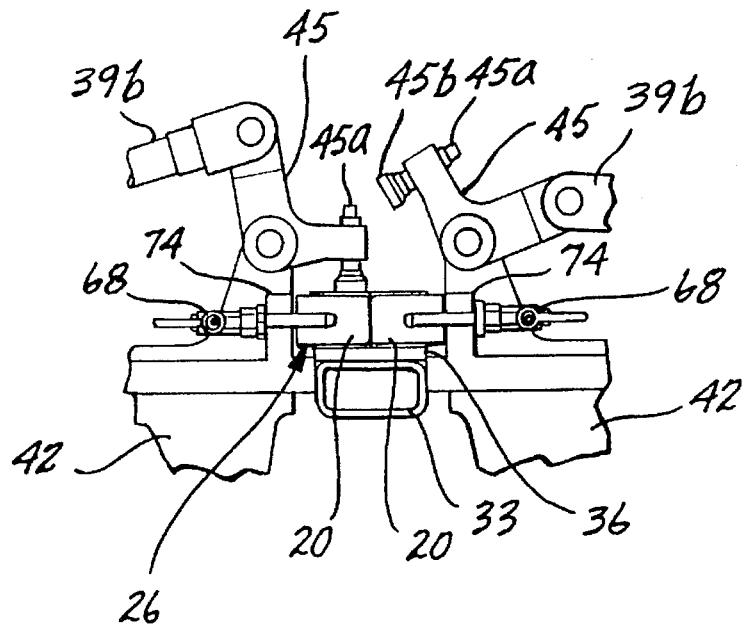
FIG. 8 is a schematic, partial cross-sectional diagram of a portion of the station of FIG. 3.

As shown in FIG. 8, a contact pin 45a extends more-or-less orthogonally through the legs of the L-shaped members 45 that extend toward and above the longitudinal platform 36. The contact pins 45a include a pressure foot 45b, which includes a spherical bearing for contact with, and self-alignment with the stringer assembly 26. The pressure foot 45b has a metal bottom surface, chosen to provide a high coefficient of friction between the pressure foot and the stringer assembly 26, and to withstand high clamping pressure against the stringer assembly when the composite stringer disassembly machine is used in the manner described below.

The hold-down clamps 38 and 40 operate as follows. In a conventional manner, the application of pressurized air to the pneumatic cylinders 39a cause the shafts 39b to extend and retract. The extension and retraction of the shafts 39b respectively causes the L-shaped members 45 to pivot resulting in the leg that extends toward and above the longitudinal platform 36 moving downwardly and upwardly. Downward movement causes the cushion member 45b of contact pin 45a to bear against a stringer assembly 26 positioned on the stationary platform, thereby clamping the stringer assembly 26 to the stationary platform 36.

Pneumatic actuators suitable for use by the invention are commercially available. Heavy duty air actuators manufactured by the Parker Cylinder Division of Portland, Oreg., and available through the Jack Ogle & Co., of Seattle, Wash., have been found suitable for use in one actual embodiment of the present invention. In this embodiment of the invention, the pneumatic actuators are operated from a source that provides a nominal air pressure of 80 psig, causing each contact pin 45a to exert a force of approximately 3,000 pounds against a stringer assembly 26. It will be readily appreciated by those skilled in the art that many other types of actuators also can be used by the invention, including electric and hydraulic actuators.

Returning to FIG. 5, a jackscrew 58 connects together the mobile platforms 42 of each of the station 32. The jackscrews are located underneath the rectangular tube 30b that forms the cross-members of the framework 30, as shown in FIG. 5. Further, as noted above, the jackscrews 58 are supported by the jackscrew brackets 52.

Each jackscrew bracket 52 comprises a pair of plates 53, mounted in spaced apart, generally parallel relationship with one another. The plates lie generally perpendicular to the longitudinal axis of the longitudinal platform 36. Each plate 53 includes a generally U-shaped portion 53a formed at the end of the plate opposite the longitudinal platform 36. A pin 53b, inserted through the U-shaped portion 53a, connects one end of a jackscrew 58 to the jackscrew brackets 52 in the manner described below. The upper edge of each jackscrew bracket plate 53 is attached to the lower edge of a side plate 47 and 48.

Each jackscrew 58 includes a cylindrical housing 64, a shaft 62, and an electric motor 60. In a conventional manner, the electric motor rotates a gear (not shown) coupled to a screw located on the end of the shaft 62 that extends into the cylindrical housing 64. As a result, when the motor is energized, the shaft is extended or retracted, depending upon the direction of rotation of the shaft of the motor. The outer end of the shaft is coupled to one of the jackscrew brackets 52 by one of the previously described pins 53b and the end of the cylindrical housing 64, remote from the outer end of the shaft 62, is coupled to the other jackscrew bracket 52 by another of the previously described pins 53b.

In operation, as the jackscrew motor 60 causes the shaft 62 to extend from the cylindrical housing 64, the mobile platforms 42 are moved farther apart from one another. Alternately, when the jackscrew motor causes the shaft 62 to retract, the mobile platforms 42 are moved closer to one another.

Interconnecting the mobile platforms 42 with a jackscrew 58 has the advantage of requiring only a single jackscrew to move the mobile platforms 42. If the mobile platforms were not interconnected as described, separate jackscrews would be required to move the mobile platforms 42, doubling the required number of jackscrews. The jackscrew 58 is preferably a conventional, electrically operated jackscrew. A jackscrew sold under the trademark ACTIONJAC, having a rating of 3,000 pounds pull at 17 inches travel per minute, manufactured by Nook Industries Inc., of Cleveland., Ohio, has been found suitable for use in one actual embodiment of the present invention.

It will be readily apparent to those skilled in the art that many other devices can be used to move the mobile platforms 42 relative to one another. For example, pneumatic or hydraulic actuators could be used, other types of electrically powered jackscrews, or gear and/or chain driven mechanisms.

Mounted on each of the stations 32 is a jackscrew position detection mechanism 105. The jackscrew position detection mechanism comprises a plurality of proximity sensors or limit switches and a mounting mechanism. As shown in FIG. 4, the mounting mechanism includes a first bracket 107 attached to one of the mobile platforms 42 and a second bracket 109 attached to the other mobile platform 42. One end of a rod 111 is affixed to the first bracket 107. The rod is slidably held in the second bracket 109. Thus, the longitudinal axis of the rod lies parallel to the axis of movement of the jackscrew 58.

A pair of elongate arms 113a and 113b extend outwardly from the second bracket 109 toward the first bracket 107. The longitudinal axes of the arms lie parallel to the longitudinal axis of the rod 111. Affixed to the outer end of the arms 113a and 113b is a cross-member 115 that is slidably mounted on the rod 111. Mounted on the rod 111 is a target 117 positioned to co-act with a plurality of proximity sensors 119a, 119b, 119c . . . mounted on the sides of the arm facing the rod. In a conventional manner the proximity sensors, which may take the form of limit switches, detect the position of the target 117. Since the position of the target is determined by the distance between the mobile platforms, the proximity sensors sense when the mobile platforms are in specific positions with respect to one another. This information is used to control the operation of the composite stringer disassembly machine in the manner described below.

Each mandrel 20 of the stringer assembly 26 includes a plurality of holes 66 as shown in FIG. 1. The holes 66 are formed in the side of the mandrel 20 that is to be pulled. Each hole 66 includes a bushing (not shown) retained by a snap ring (not shown) located near the entrance of the hole 66.

Figure 7:
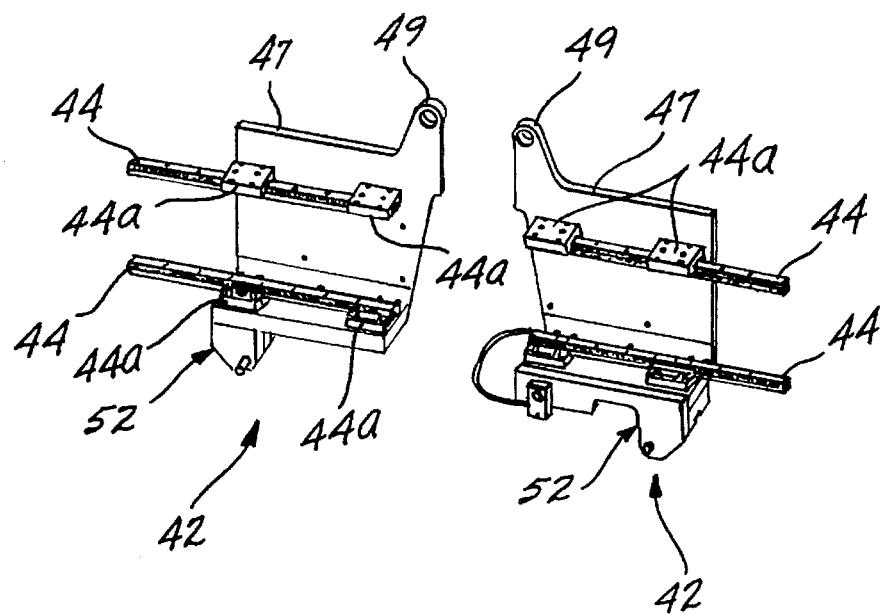
FIG. 7 is a perspective view of a ball lock pin of the machine of FIG. 2.

Each mobile platform 42 includes a ball lock pin 68, best shown in FIG. 7, for insertion into a hole 66 in one of the mandrels 20 of a stringer assembly 26. The insertion end 71 of the pin 68 includes spring-loaded ball beatings 70 that project radially from around the circumference of the pin. The ball bearings are free to move inwardly when a button 72 located at the opposite end of the pins is pressed inwardly. When the button is released, the ball beatings are latched in their extended positions. When a pin 68 is inserted into a hole 66 in one of the mandrels, the button is depressed. As the pin first enters the aforementioned bushing, the ball bearings are forced inward, compressing the springs. When the pin 68 is inserted deep enough into a hole 66, the ball beatings become aligned with a groove in the bushing, permitting the ball beatings to extend outward, and locking the pin into place. When it is desired to remove pin 68 from a hole 66, the release button 72 is depressed, which allows the spring to compress and permit the ball beatings to retract, enabling the pin to be withdrawn from the hole using a pull clevis 73 affixed to the button end of the pin 72.

Prior to entering the holes 66 in the mandrels 20, the pins 68 are passed through a hole in the inner bridge member 74 of each mobile platform 42 as illustrated in FIG. 8. As described above, the inner bridge member 74 is a generally vertical cross-plate that connects the corners 49 of the two side plates 47 and 48 to the mobile platforms 42. When the jackscrews 58 are operated to move the mobile platforms 42 away from one another, the mobile platforms 42 pull on the pins 68, which in turn pull on the mandrels 20.

Included with the some, if not all of the stations 32, is a rotary composite I-beam clamp 76 (see FIG. 3). The rotary composite I-beam clamps 76 are mounted to the framework 30. More specifically, the rotary composite I-beam clamps are affixed to the longitudinal rectangular tube 33, all on the same side of the tube. The rotary composite I-beam clamps 76 are used to clamp a side of stringer assembly 26 to the stationary platform 36 after a mandrel 20 has been removed from that side of the stringer assembly in the manner described below.

Each of the rotary composite I-beam clamps 76 includes a conventional, rotary pneumatic actuator comprising a cylindrical housing 78 and a shaft 80. Rotary pneumatic actuators manufactured by PHD Corp. of Fort Wayne, Ind., have been found suitable for use in one actual embodiment of the present invention. These rotary pneumatic actuators provide approximately 150 pounds of clamping force from a nominal air supply of 110 psig.

Figure 9:
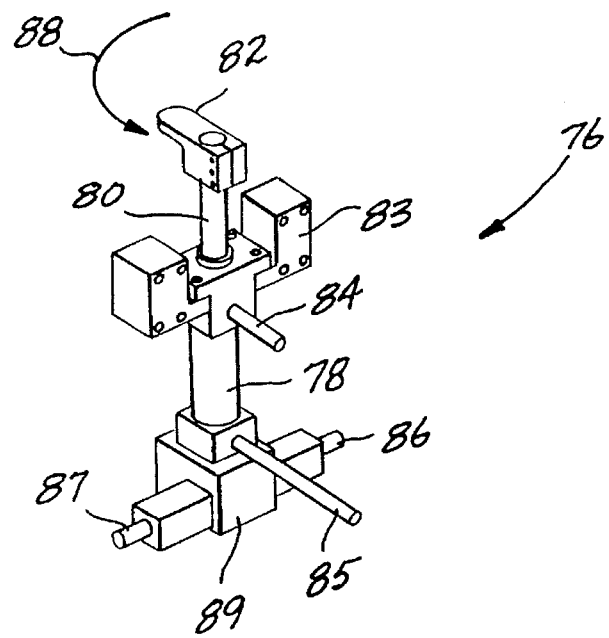
FIG. 9 is a perspective view of a rotary composite I-beam clamp.

FIG. 9 shows a rotary composite I-beam clamp 76 removed from the rest of the composite stringer disassembly machine 28. The purpose of the rotary composite I-beam clamp 76 is to prevent the stringer assembly 26 from becoming dislodged from the platform 36 and damaged when the last mandrel 20 is pulled out. In addition to the pneumatic actuator, the rotary composite I-beam clamp 76 includes a finger extension 82 having a cushioned contact pad on its distal end, attached in a cantilever manner to the end of the shaft rod 80 of the pneumatic actuator. The rotary composite I-beam clamp 76 also includes a bracket 83 for attaching the cylindrical housing 78 of the pneumatic actuator to the longitudinal rectangular tube 33. The pneumatic actuators are mounted such that their shafts 80 are vertical and extend upwardly. Air inlet lines 84 and 85 are attached to ports located at the top and the bottom of the cylindrical housing 78. Air inlet lines 86 and 87 are attached to the ports of a rotation mechanism 89 located at the bottom of the cylindrical housing 78. When air is applied to the top inlet of the cylindrical housing, the shaft 80 is withdrawn. When air is applied to the bottom inlet of the cylindrical housing 78, the shaft 80 is extended. When air is applied to the inlet of the rotation mechanism 89, the shaft 80 rotates through an arc of 90 degrees in the clockwise direction and when air is applied to the other inlet of the rotation mechanism 89, the shaft rotates 90 degrees in the counterclockwise direction.

The rotary composite I-beam clamp 76 shown in FIG. 9 is positioned to clamp the stringer of a stringer assembly 26 to the longitudinal platform 36. When in this position, the finger extension protrudes into the channel on one side of a stringer assembly after the mandrel located on that side has been removed. Further, air applied to the upper end of the cylindrical housing 78 causes the shaft 80 of the pneumatic actual; or to create a downward force that presses the lower web of the I-beam of the stringer assembly against the longitudinal platform 36. When it is desired to unclamp the stringer assembly 26, the air supply to the upper end of the cylindrical housing is terminated and pressurized air is supplied to the lower end of the cylindrical housing. This causes the shaft 80 to extend, unclamping the stringer assembly 26. Pressurized air is then supplied to the appropriate port of the rotation mechanism 89. This causes the shaft 80 to rotate approximately 90 degrees in the direction indicated by arrow 88. This action rotates the finger extension 82 out of the way of the stringer assembly 26. The air supplied to the lower end of the cylindrical housing 78 is then terminated and pressurized air is supplied to the upper end of the cylindrical housing. This causes the shaft 80 to retract, moving the finger extension 82 to a position below the longitudinal platform 36. This procedure is reversed when it is desired to raise the finger extension, rotate the finger extension into position and ,clap the lower end of an I-beam of the stringer assembly 26 to the longitudinal platform 36.

Referring to FIGS. 2 and 3, guide yokes 90 are located at each longitudinal end of the framework 30. The guide yokes 90 are used to aid in positioning a stringer assembly 26 on the longitudinal platform 36. The stringer assembly 26 is preferably placed on the longitudinal platform 36 by a load bar assembly (not shown) suspended from a crane (not shown). The guide yokes 90 include a plate 91 that includes two upwardly directed arms 92 and 94. The arms are located on opposite sides of the longitudinal platform. When a load bar assembly is lowered, the load bar is received between the arms 92 and 94 to align the stringer assembly 26 crosswise with the longitudinal platform 36.

The guide yokes 90 also include a ramp 96, positioned at the base of the guide yoke and at the end of the longitudinal platform 36. The ramps 96 include a sloped portion 97, that slopes downwardly from each guide yoke toward the end of the longitudinal platform 36. The ramps 96 align the ends of the stringer assembly 26 with the ends of the longitudinal platform 36 as a load bar assembly is lowering a stringer assembly on the platform. Longitudinal alignment is necessary so that the ball lock pins 68 can be readily inserted through the mobile platforms 42 into the mandrels 20, as described above.

Mechanical Operation and Control of the System

Figure 10:
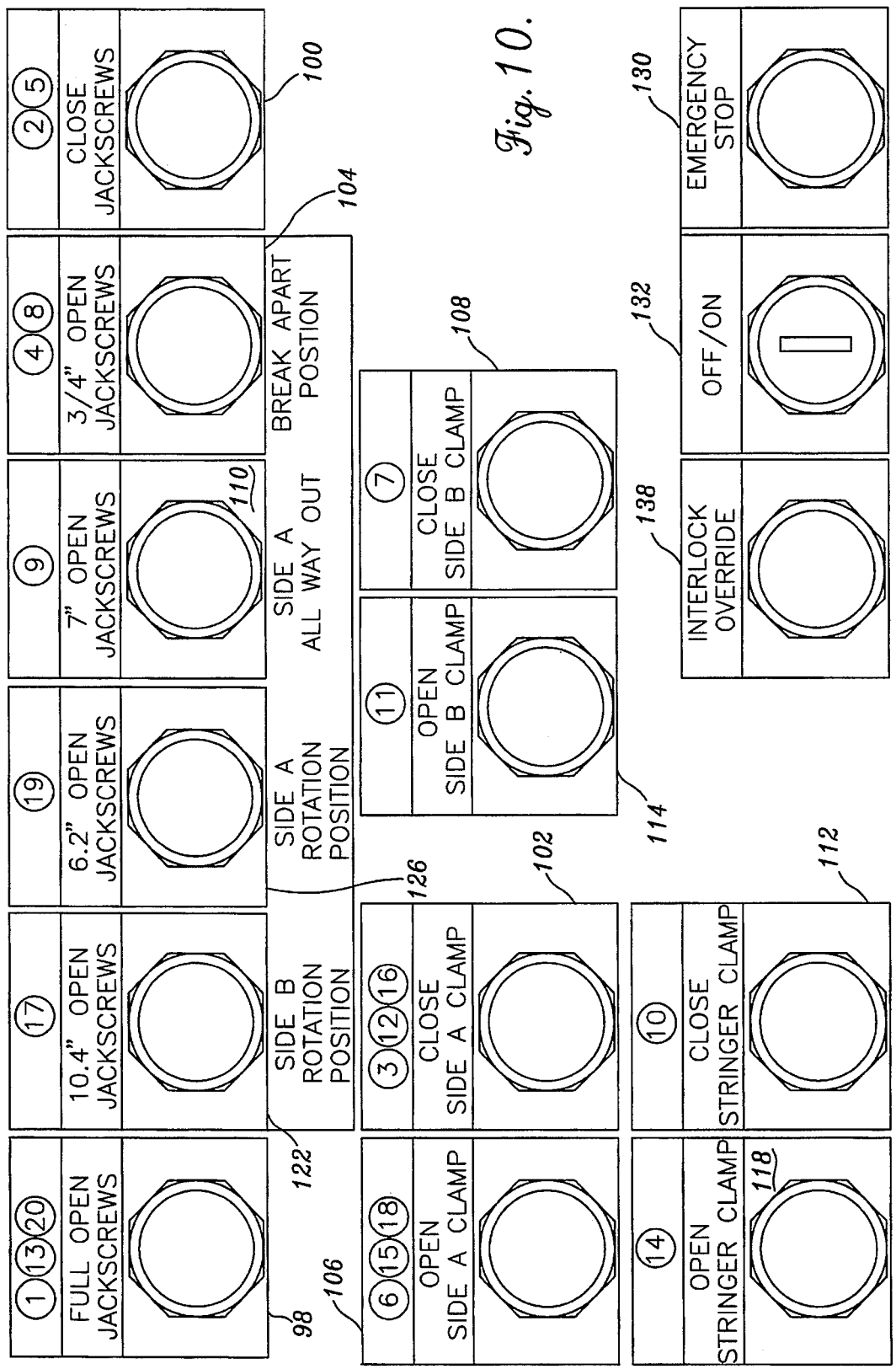
FIG. 10 is a schematic diagram of the control panel of the machine of FIG. 2.

The control console 34 shown in FIG. 1 allows personnel to control the operation of the, composite stringer disassembly machine 28 by pressing buttons located on the front panel of the control console 34. The buttons located on the front panel of control console 34 are shown in FIG. 10. As shown in FIG. 10, each of the buttons are numbered in the sequence that they are preferably pressed for disassembling a stringer assembly 26. Some buttons are numbered more than once because these buttons are pressed more than once when disassembling a stringer assembly 26. In this regard, FIG. 11 is a table that sets forth the sequence in which the buttons are pressed.

Before placing a stringer assembly 26 on the longitudinal platform 36, a first button 98, labeled Full, Open Jackscrews, is pressed. Pressing the first button 98 energizes the jackscrew motors 60 to move the mobile platforms 42 as far as possible from one another to provide as much space as possible to position a stringer assembly 26 on the longitudinal platform 36. Thereafter, the stringer assembly 26 is lowered onto the longitudinal platform 36, using the guide yokes 90 (see FIG. 3) to approximately position and align the stringer assembly on the longitudinal platform in the manner previously described.

After the stringer assembly 26 has been placed on the longitudinal platform 36, a second button 100, labeled Close Jackscrews is pressed. Pressing the second button 100 energizes the jackscrew motors 60 in the reverse direction to move the mobile platforms 42 toward one another until the inner bridge members 74 impinge on the facing surfaces of the mandrels of the stringer assembly 26 located on the longitudinal platform 36. If the stringer assembly 26 is not centered on the longitudinal platform 36, the mobile platforms 42 will push against the stringer assembly until the stringer assembly is centered. After the jackscrews 58 have moved the mobile platforms 42 against the stringer assembly 26, the ball lock pins 68 are manually inserted through each of the inner bridge members 77 of the mobile platforms into the mandrels 20 of the stringer assembly.

Subsequently, a third button 102, labeled Close Side A Clamp, is pressed. Pressing the third button 102 actuates a conventional solenoid valve (see FIGS. 12A–12C) to supply compressed air to the pneumatic cylinders 39a of the hold-down clamps 38 located on the same side of the longitudinal platform 36 as the rotary composite I-beam clamps 76. The compressed air is applied to the end of the pneumatic cylinders 39a that causes the associated shafts 39b to extend. The extended hold-down clamps 38 clamp one side of the stringer assembly 26 to the longitudinal platform 36.

Then a fourth button 104, labeled ¾" Open Jackscrews, is pressed. Pressing the fourth button 104 energizes the jackscrew motors 60 to move the mobile platforms 42 away from one another. Because the extended hold-down clamps 38 are clamping the stringer assembly 26 to the longitudinal platform 36 (which is affixed to the framework 30 and, thus, is stationary) only the mobile platforms supporting the retracted hold-down clamps 40 move away from the longitudinal platform. Consequently, the mandrel 20 adjacent the retracted hold-down clamps 40 is broken loose and pulled away from stringer assembly 26. The jackscrews 58 are operated just long enough to break the mandrel 20 free from stringer assembly 26. This condition is met when the mobile platforms 42 have moved away from one another a minimum distance falling in the range of one-half to three-quarters of an inch (preferably three-quarters of an inch). The appropriate distance exists when the appropriate proximity sensor or limit switches 119a, 119b, 119c . . . (FIG. 4) detects the target 117.

After the mandrel 20 adjacent the retracted hold-down clamps 40 has been broken free, the second button 100 is pressed again. Pressing the second button 100 reverses the operation of the jackscrews 58 resulting in the freed mandrel being pushed back into the stringer assembly 26.

After the mandrel 20 has been pushed back into the stringer assembly 26, a fifth button 106, labeled Open Side A Clamp, is pressed. Pressing the fifth button 106 actuates a conventional solenoid valve (see FIGS. 12A–12C) to reverse air pressure to the opposite side of the air cylinder piston, thereby retracting the shaft 39b. As a result, the previously extended hold-down clamps 38 are retracted and the stringer assembly 26 is unclamped.

Then a sixth button 108, labeled Close Side B Clamp, is pressed. Pressing the sixth button 108 actuates a conventional solenoid valve (not shown) to supply compressed air to the side of the air cylinder piston of each pneumatic cylinder 39a, which extends the shaft 39b of the other set of hold-down clamps 40. As a result, the stringer assembly 26 is again clamped to the longitudinal platform 36, but on the other side.

Subsequently, the fourth button 104 is pressed again. Pressing the fourth button 104 energizes the jackscrew motors to move the mobile platforms 42 away from one another and break the other mandrel 20 free from the stringer assembly 26 by approximately ¾ inch in the manner described above. Again, the ¾ inch position is determined when one of the proximity sensors or limit switches 119a, 119b, 119c . . . detects the target 117.

After both mandrels 20 have been broken free from stringer assembly 26, a seventh button 110, labeled 7" Open Jackscrews, is pressed. Pressing the seventh button 110 energizes the jackscrew motors 60 to move the mobile platforms 42 a further distance away from one another. The further distance is adequate to completely remove the other mandrel 20 away from the stringer assembly 26. That is because one set of the hold-down clamps 40 are clamping the stringer assembly 26 to the longitudinal platform 36, only the mandrel 20 adjacent the other set of hold-down clamps 38 moves. This mandrel is removed from the stringer assembly 26. The distance the mandrel 20 is removed from the stringer assembly 26 results in the mandrel resting on the side platforms 116 (see FIG. 3) located on one side of the longitudinal platform 36. The ball lock pins 68 hold the mandrel 20 against the mobile platform 42, as the mandrel is carded above the channel 128 onto the side Thereafter, the third button 102 is pressed again. Pressing the third button 102 causes the shafts of the other hold-down clamps 38 to extend in the manner described above. The extended hold-down clamps 38 now clamp the previously removed mandrel 20 to the side platforms 116. The purpose of extending this set of hold-down clamps 38 is to prevent the mobile platforms 42 supporting these hold-down clamps from moving when the jackscrews are again energized during the next step.

The next step is to press the first button 98 again. Pressing the first button 98 causes the jackscrews 58 to move the mobile platforms 42 the maximum distance away from one another, as previously discussed. As the mobile platforms 42 move the maximum separation distance, the previously loosened mandrel 20 is moved to a position atop the other set of side platforms 120. As a result, one mandrel 20 rests on one set of side platforms 116 and the other mandrel rests on the other set of side platforms 120.

Thereafter, a tenth button 118, labeled Open Stringer Clamp, is pressed. Pressing the tenth button 118 actuates a series of solenoid valves (see FIGS. 12A–12C) to return the cantilevered arms 82 of the rotary composite I-beam clamps 76 to their retracted position. First, the valve that controls the supply of compressed air to the upper end of the cylinders 78 of the rotary composite I-beam clamps is actuated to stop supplying air and the valve that controls the supply of air to the lower end of the cylinders is actuated to supply air. As a result, the shafts 80 of the rotary composite I-beam clamps raise, raising the cantilevered arms. Then the valve that controls supplying pressurized air to the inlet port of the rotation mechanisms 89 that causes the shafts to rotate 90 degrees is actuated, moving the cantilevered arm out of the cavity in the stringer assembly in which the arm was previously located is actuated. Next the valve that controls supplying pressurized air to the bottom of the cylinders 78 is deactivated and the valve that controls supplying pressurized air to the top of the cylinders is actuated. As a result, the shafts 80 of the rotary composite I-beam clamps are withdrawn.

After the rotary composite I-beam clamps 76 have unclamped the stringer assembly 26, the ball lock pins 68 are manually removed from the mandrels 20. Next, the third button, labeled Close Side A is pressed again, to activate the hold-down clamps 38. This ensures that the mandrel 20, adjacent hold-down clamps 40, will be pushed into the channel 124 by the mobile platforms 42. Otherwise it is unpredictable which mandrel 120 would be pushed into a channel 124 or 128 by the mobile platforms 42. platforms 116. One of the proximity sensors or limit switches 119a, 119b, 119c . . . is actuated when the jackscrew reaches the desired position to terminate the application of power to the jackscrew.

Next, an eighth button 112, labeled Close Stringer Clamp, is pressed. Pressing the eighth button 112 actuates, in sequence, solenoid valves (see FIGS. 12A–12C) that supply compressed air to the rotary composite I-beam clamps 76. A first valve is opened to supply air to the inlet of the air inlet port located at the bottom of the cylindrical housings 78 of the rotary composite I-beam clamps 76. As a result, the shafts 80 of the rotary composite I-beam clamps rise. Then the valve that supplies compressed air to the inlet port of the rotation mechanisms 89 of the rotary composite I-beam clamps that cause the shafts 80 to rotate 90 degrees is actuated. As a result, the cantilevered arm 82 is extended into the cavity in the stringer assembly created by the removed mandrel. Then the valve that supplies pressurized air to the inlet port located at the bottom of the cylindrical housings 78 of the rotary composite I-beam clamps is deactivated and the valve that supplies pressurized air to the inlet port located at the top of the housings is actuated. As a result, the shafts of the rotary composite I-beam clamps move down, pressing the cantilevered arm 82 against the lower web of the composite I-beam and clamping the remaining portion of the stringer assembly to the longitudinal platform 36.

When a mandrel 20 is not present to support the channel charges 22 of a stringer assembly, the stringer assembly 26 is more fragile. Hence, the rotary composite I-beam clamps 76 only provide about 5% of the clamping force of the more powerful hold-down clamps 38 and 40. The purpose of rotary composite I-beam clamps 76 is to hold the stringer assembly 26 in place, while the jackscrews 58 are operated to move the remaining mandrel 20, which has previously been broken free, away from the stringer assembly. Since the rotary composite I-beam clamps 76 are not required to hold the stringer assembly 26 in place while a mandrel is being broken free, the rotary composite I-beam clamps are not required to supply as great a holding force.

Then a ninth button 114, labeled Open Side B Clamp, is pressed. Pressing the ninth button 114 deactivates the solenoid valve that supplies pressurized air to the end of the pneumatic cylinders 39a of the extended hold-down clamps 40 that cause the shafts 39b of these clamps to extend and actuates a valve that supplies pressurized air to the ends of the cylinders that cause the shafts to retract. This causes the hold-down clamps 40 to retract and unclamp the stringer assembly 26.

Then an eleventh button 122, labeled 10.4" Open Jackscrews, is pressed. Pressing the eleventh button 122 energizes the jackscrew motors 60 to close the relative distance between the mobile platforms 42 by 10 or 11 inches (nominally 10.4 inches). This causes the mobile platforms 42 to push the mandrel 20 adjacent the de-energized hold-down clamps 40 until it drops into the channel 124 adjacent the associated side platforms 120 for later removal. Again one of the proximity sensors or limit switches 119a 119b, 119c . . . is actuated when the jackscrews reach the correct position to shut down the application of power to the jackscrews.

Then the fifth button 106 is pressed again. Pressing the fifth button 106 causes the shafts of the extended set of hold-down clamps 38 to retract. This causes this set of hold-down clamps 38 to unclamp the stringer assembly 26 from the associated side platforms 116.

Finally, a twelfth button 126, labeled 6.2" Open Jackscrews, is pressed. Pressing the twelfth button 126 energizes the jackscrew motors 60 to further close the relative distance between the mobile platforms 42 by approximately six inches (nominally 6.2 inches) as determined by another one of the proximity sensors or limit switches 119a, 119b, 119c . . . . This causes the other mobile side platforms 42 to push the other mandrel 20 until it drops into the channel 128 adjacent the associated side platforms 116 for later removal. When the mandrels 20 drop into a channel 124 or 128, they rotate through 90 degrees resulting in the mandrels projecting out the channel, above the level of the platforms. Thus, when the twelfth button 126 is pressed to further move the mobile platforms 42 towards one another, the mobile platforms adjacent the previously pushed mandrels are prevented from moving because these platforms press against the upstanding mandrels. Hence, only the other mobile platforms 42 move, resulting in the remaining mandrel 20 being pushed until it drops into the channel 128. After the mandrels rotate, the upper side is the side containing the holes 66. Exposure of the holes 66, allows the holes to be used by pickup equipment (not shown) to raise and move the mandrels.

The control console 34 includes an emergency stop button 130. Pressing the emergency stop button 130 causes all action of the composite stringer disassembly machine 28 to cease. The control console 34 also includes a key switch 132, which is actuated by a key (not shown). When the key switch 132 is mined to the appropriate position, the control console 34 is locked so that it cannot be used.

Figure 12A:
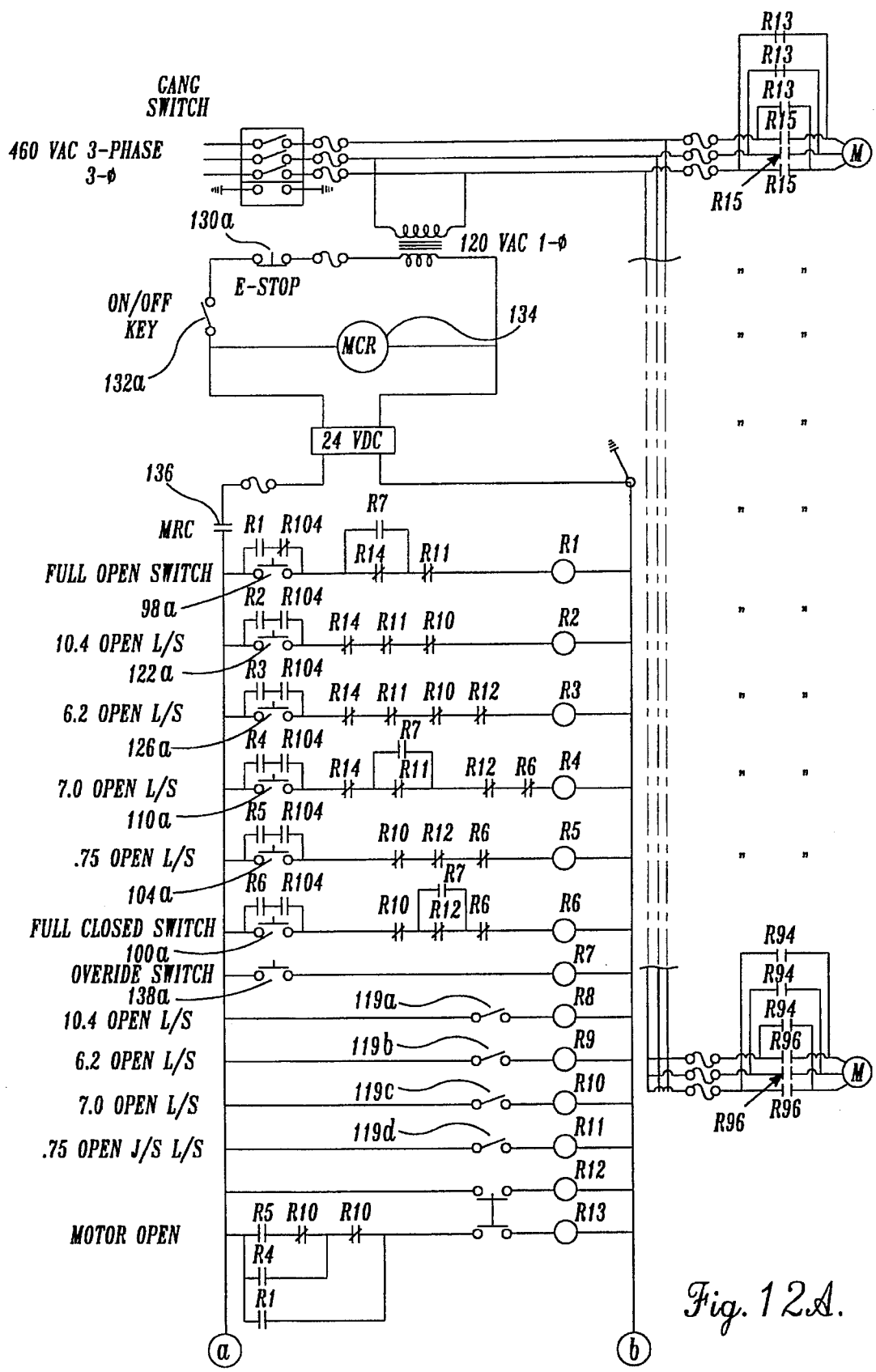
FIGS. 12A–12C are a logic schematic for the machine of FIG. 2.
Figure 12B:
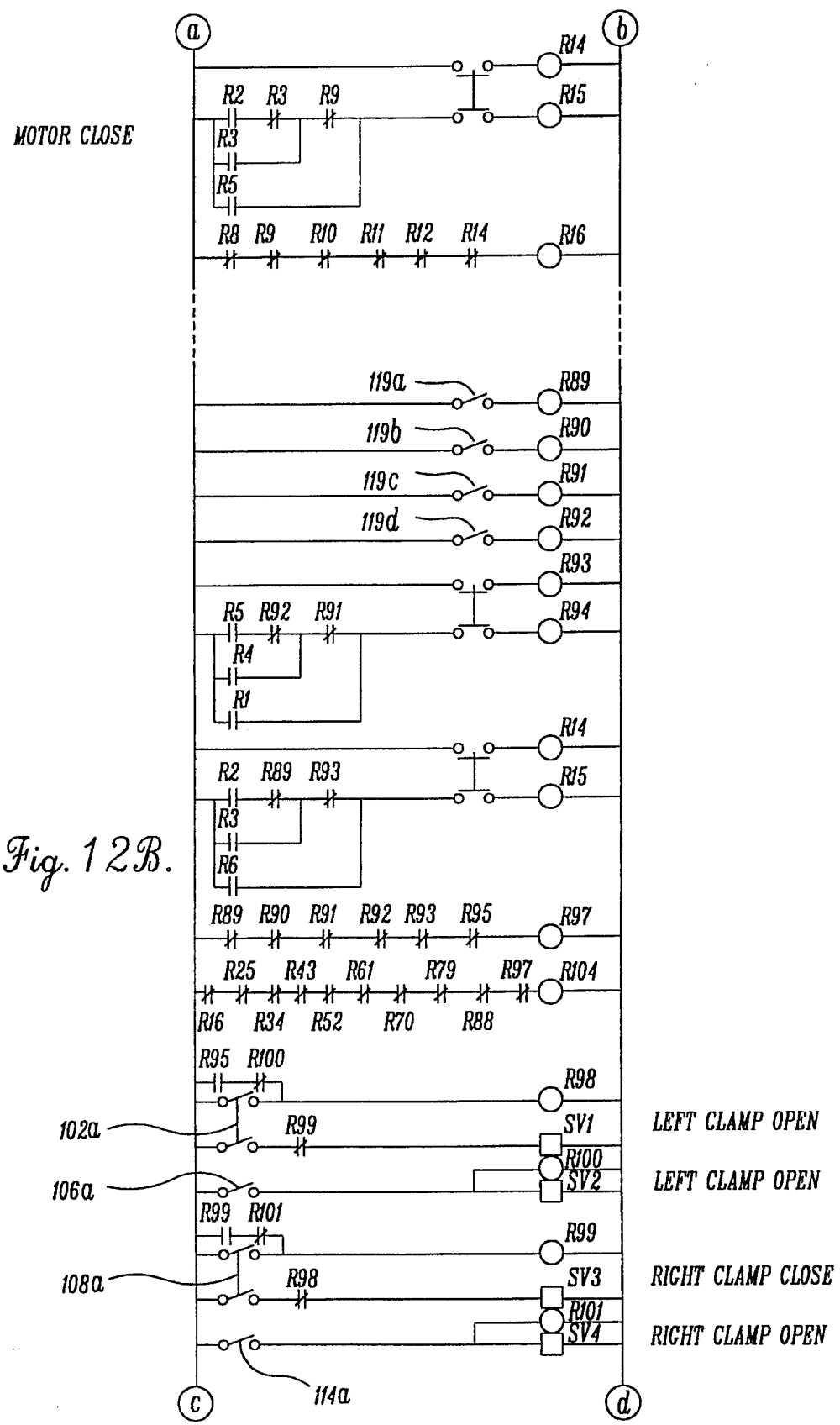
Figure 12C:
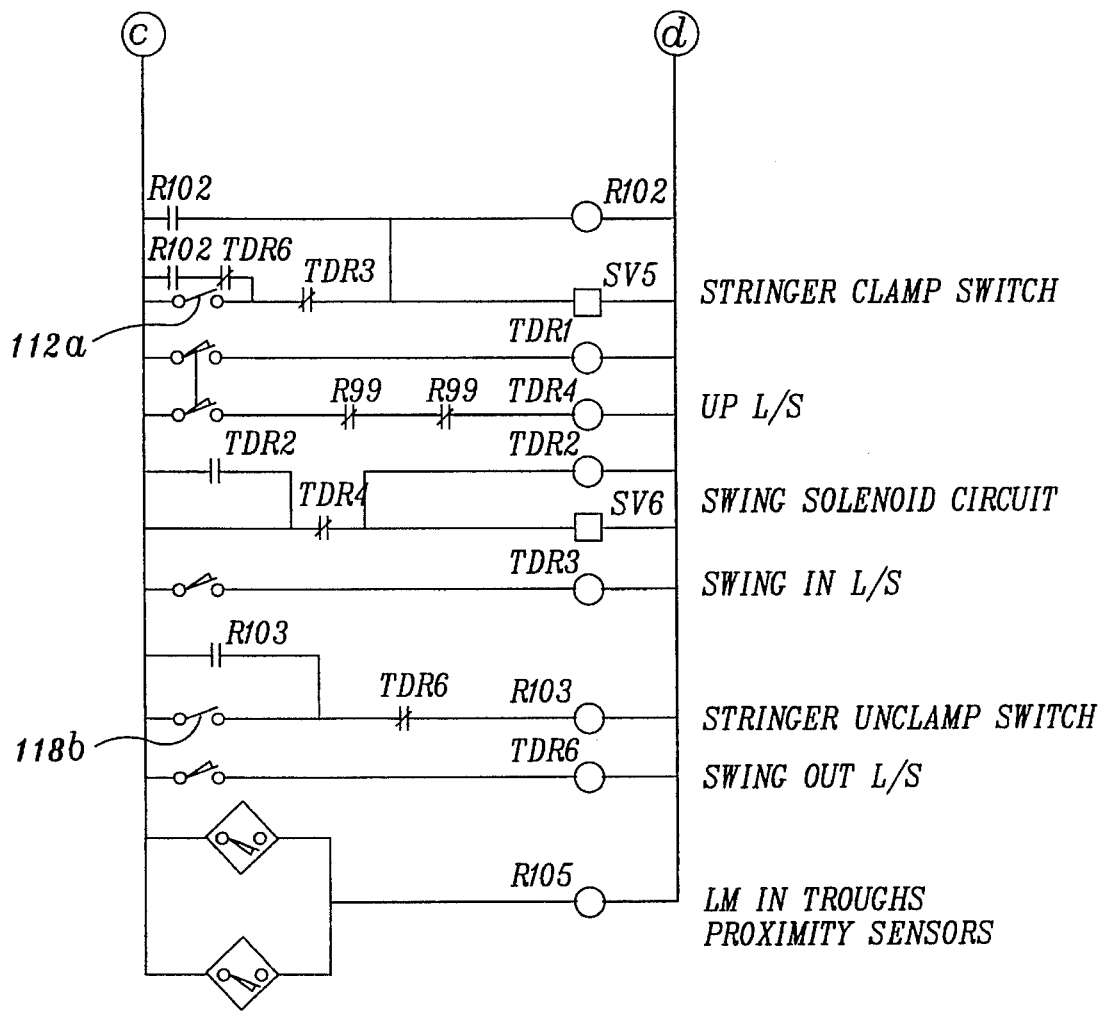

A programmable, logic controller (not shown) is included within the control console 34 to control the composite stringer disassembly machine 28 in response to button presses by operating personnel. A schematic logic diagram of the logic incorporated in the logic controller to control the composite stringer disassembly machine 34 is illustrated in FIGS. 12A–12C. Since the operation of logic controllers of the type shown in FIGS. 12A–12C will be readily apparent to those familiar with such controllers, the operation of the controller is not described here.

The switches operated by depressing the buttons shown in FIG. 10 and described above are identified by similar reference numbers with the addition of the letter "a" in FIGS. 12A–12C. The elements controlled by the pressing of a button to close or open a switch are schematically illustrated as controlled by the contacts of relays, the coils of the relays being energized, or in some cases de-energized when a switch is actuated by the pressing of a button. In reality, the relays shown in FIGS. 12A–12C do not physically exist, except for the master control relay (MCR) as discussed below. Rather, the relays are programmed in PLC software.

The proximity sensors or limit switches shown in FIGS. 12A–12C have the same reference numbers as in FIG. 4. For ease of illustration and in order to avoid unnecessary duplication only the circuitry and proximity sensors or limit switches associated with the first and last stations 32 are shown in FIGS. 12A–12C.

As shown in FIG. 12A, the emergency stop button 130 and key switch 132, control the application of power to the master relay control 134. If master relay control 134 is not energized, master relay contacts 136 remain open, preventing the application of power to the other relays and, thus, the operation of the composite stringer disassembly machine 28.

The logic also includes some interlocks that prevent personnel from performing at least some functions out of order. Pressing interlock override button 138 on control console 34 disables at least some of the interlocks so that some functions can be performed out of order. Other features of the logic incorporated into the composite disassembly machine 28 will be readily appreciated by those skilled in the art by reference to FIGS. 12A–12C and the foregoing description.

While a preferred embodiment of the invention has been illustrated and described, it will be appreciated that, within the scope of the appended claims, various changes can be made therein without departing from the spirit and scope of the invention.

The embodiments of the invention in which an exclusive property or privilege is claimed are defined as follows:

1. A machine for use in removing first and second mandrels from a composite I-beam, the first mandrel being held in the one channel of the I-beam, and the second mandrel being held in the other channel of the I-beam, the machine comprising:
   (a) a frame;
   (b) a longitudinal platform mounted on said frame for supporting a stringer assembly comprising a composite I-beam and first and second mandrels held in the channels of said composite I-beam;
   (c) a plurality of stations mounted on said frame and positioned along the length of said platform, each of said stations including:
      (1) first clamp means for clamping one side of said stringer assembly to said longitudinal platform;
      (2) second clamp means for clamping the other side of said stringer assembly to said longitudinal platform;

(3) pulling means for applying a pulling force to each mandrel to pull each mandrel away from said composite I-beam; and (4) third clamp means for clamping the remainder of said stringer assembly to said longitudinal platform after said first mandrel has been removed from a channel of said composite I-beam; and (d) control means connected to said first, second and third clamp means and to said pulling means for actuating said first, second and third clamp means and said pulling means to sequentially clamp said stringer assembly to said longitudinal platform and pull said mandrels out of the channels in said composite I-beam.

2. The machine of claim 1, wherein said control means causes said first, second, and third clamp means and said pulling means to sequentially:

(1) clamp one side of said stringer assembly to said longitudinal platform;

(2) partially pull a mandrel from the side of said stringer assembly remote from the side clamped to said longitudinal platform to loosen the mandrel;

(3) unclamp the side of the stringer assembly previously clamped to said longitudinal platform;

(4) clamp the other side of the stringer assembly to said longitudinal platform;

(5) pull the other mandrel from said stringer assembly;

(6) clamp the side of the composite I-beam from which the mandrel has been removed to the longitudinal platform;

(7) unclamp the other side of the stringer assembly from the platform; and (8) pull the loosened mandrel from the stringer assembly.

3. The machine of claim 2, wherein said first and second clamp means each include movable platforms and clamps mounted on said movable platforms, said moveable platforms being movably mounted on said frame on opposite sides of said longitudinal platform and wherein said pulling means comprises moving means for moving said movable platforms toward and away from one another and coupling means for coupling said movable platforms to said mandrels.

4. The machine of claim 3, wherein said moving means includes a linear actuator, one end of said linear actuator being connected to one of said movable platforms and the other end of said linear actuator being connected to the other one of said movable platforms.

5. The machine of claim 4, wherein said coupling means comprises holes in said mandrels and pins for coupling said movable platforms to the holes in said mandrels.

6. The machine of claim 5, further comprising alignment means mounted on said frame for aligning the ends of said composite I-beam on said longitudinal platform.

* * * * *

UNITED STATES PATENT AND TRADEMARK OFFICE
CERTIFICATE OF CORRECTION

Page 1 of 3

PATENT NO. : 5,502,886
DATED : April 2, 1996
INVENTOR(S) : D.A. Jensen et al.

Figure 6:
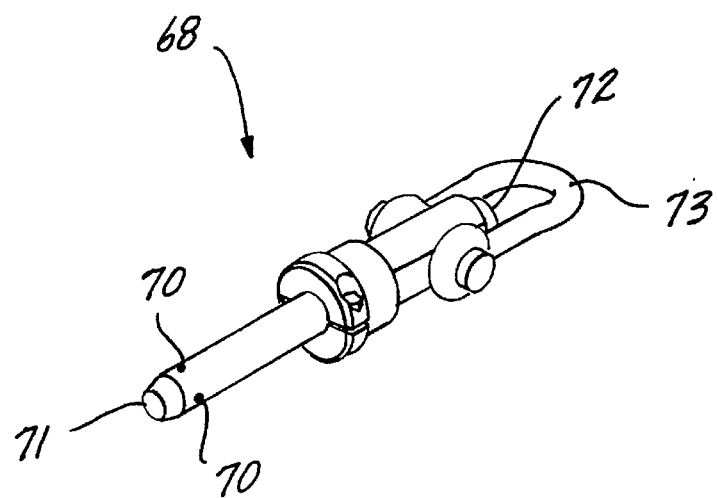

It is certified that error appears in the above-indentified patent and that said Letters Patent is hereby corrected as shown below:

| COLUMN | LINE | |
|---|---|---|
| On Title page Item [75] (pg. 1, col. 1) | Inventors (lines 2-3) | Delete "Joel M. Thomas, Kent, Wash." |
| Drawing Sheet | Sheet 5 of 11 | Fig. 6 is mislabeled as Fig. 7 |
| Drawing Sheet | Sheet 5 of 11 | Fig. 7 is mislabeled as Fig. 6 |
| 5 | 48 | "comers" should read --corners-- |
| 5 | 50 | "comers" should read --corners-- |
| 5 | 53 | "comers" should read --corners-- |
| 5 | 59 | "rail;," should read --rail-- |
| 5 | 59 | "cartage" should read --carriage-- |
| 5 | 66 | "beating" should read --bearing-- |
| 5 | 67 | "beatings" should read --bearings-- |
| 6 | 10 | "beating" should read --bearing-- |
| 6 | 11 | "mourned" should read --mounted-- |

UNITED STATES PATENT AND TRADEMARK OFFICE
CERTIFICATE OF CORRECTION

PATENT NO. : 5,502,886  
DATED : April 2, 1996  
INVENTOR(S) : D.A. Jensen et al.

It is certified that error appears in the above-indentified patent and that said Letters Patent is hereby corrected as shown below:

| COLUMN | LINE | |
|---|---|---|
| 6 | 14 | "cartage" should read --carriage-- |
| 6 | 14 | "beating" should read --bearing-- |
| 6 | 18 | "beating" should read --bearing-- |
| 6 | 31 | "comers" should read --corners-- |
| 8 | 27 | "beatings" should read --bearings-- |
| 8 | 31 | "beatings" should read -bearings-- |
| 8 | 37 | "beatings" should read --bearings-- |
| 8 | 48 | "comers" should read --corners-- |
| 10 | 16 | "the," should read --the-- |
| 11 | 60 | "carded" should read --carried-- |
| 12-13 | 40-22 | After "42." move --platforms 116. One of the |

UNITED STATES PATENT AND TRADEMARK OFFICE
CERTIFICATE OF CORRECTION

PATENT NO. : 5,502,886
DATED : April 2, 1996
INVENTOR(S) : D.A. Jensen et al.

It is certified that error appears in the above-indentified patent and that said Letters Patent is hereby corrected as shown below:

assembly 26.--to column 11, line 60 after "side".

Signed and Sealed this

Third Day of September, 1996

Attest:

BRUCE LEHMAN

Attesting Officer     *Commissioner of Patents and Trademarks*

UNITED STATES PATENT AND TRADEMARK OFFICE
CERTIFICATE OF CORRECTION

PATENT NO. : 5,502,886
DATED : April 2, 1996
INVENTOR(S) : D.A. Jensen et al.

Page 1 of 3

It is certified that error appears in the above-indentified patent and that said Letters Patent is hereby corrected as shown below:

| COLUMN | LINE | |
|---|---|---|
| [75] (pg. 1, col. 1) | Inventors (lines 2-3) | Delete "Joel M. Thomas, Kent, Wash." |
| Drawing Sheet | Sheet 5 of 11 | Fig. 6 is mislabeled as Fig. 7 |
| Drawing Sheet | Sheet 5 of 11 | Fig. 7 is mislabeled as Fig. 6 |
| 5 | 48 | "comers" should read --corners-- |
| 5 | 50 | "comers" should read --corners-- |
| 5 | 53 | "comers" should read --corners-- |
| 5 | 59 | "rail;," should read --rail-- |
| 5 | 59 | "cartage" should read --carriage-- |
| 5 | 66 | "beating" should read --bearing-- |
| 5 | 67 | "beatings" should read --bearings-- |
| 6 | 10 | "beating" should read --bearing-- |
| 6 | 11 | "mourned" should read --mounted-- |

UNITED STATES PATENT AND TRADEMARK OFFICE
CERTIFICATE OF CORRECTION

PATENT NO. : 5,502,886  Page 2 of 3
DATED : April 2, 1996
INVENTOR(S) : D.A. Jensen et al.

It is certified that error appears in the above-indentified patent and that said Letters Patent is hereby corrected as shown below:

| COLUMN | LINE | |
|---|---|---|
| 6 | 14 | "cartage" should read --carriage-- |
| 6 | 14 | "beating" should read --bearing-- |
| 6 | 18 | "beating" should read --bearing-- |
| 6 | 31 | "comers" should read --corners-- |
| 8 | 27 | "beatings" should read --bearings-- |
| 8 | 31 | "beatings" should read -bearings-- |
| 8 | 37 | "beatings" should read --bearings-- |
| 8 | 48 | "comers" should read --corners-- |
| 10 | 16 | "the," should read --the-- |

UNITED STATES PATENT AND TRADEMARK OFFICE
CERTIFICATE OF CORRECTION

PATENT NO. : 5,502,886
DATED : April 2, 1996
INVENTOR(S) : D.A. Jensen et al.

Page 3 of 3

It is certified that error appears in the above-indentified patent and that said Letters Patent is hereby corrected as shown below:

| COLUMN | LINE | |
|---|---|---|
| 11 | 60 | "carded" should read --carried-- |
| 12-13 | 40-22 | After "42." move --platforms 116. One of the . . . assembly 26.-- to column 11, line 60 after "side" |

Signed and Sealed this

Fourth Day of February, 1997

Attest:

BRUCE LEHMAN

Attesting Officer

Commissioner of Patents and Trademarks